US012246427B2

(12) United States Patent
Machida et al.

(10) Patent No.: US 12,246,427 B2
(45) Date of Patent: Mar. 11, 2025

(54) POWER TOOL HAVING A HAMMER MECHANISM

(71) Applicant: MAKITA CORPORATION, Anjo (JP)

(72) Inventors: Yoshitaka Machida, Anjo (JP); Kazuki Nakagawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/667,889

(22) Filed: Feb. 9, 2022

(65) Prior Publication Data

US 2022/0266433 A1 Aug. 25, 2022

(30) Foreign Application Priority Data

Feb. 22, 2021 (JP) ................................ 2021-026285

(51) Int. Cl.
*B25D 17/04* (2006.01)
*B25D 16/00* (2006.01)

(52) U.S. Cl.
CPC .......... *B25D 17/043* (2013.01); *B25D 16/006* (2013.01); *B25D 2211/068* (2013.01);
(Continued)

(58) Field of Classification Search
CPC ...... B25D 16/00; B25D 16/006; B25D 17/00; B25D 17/04; B25D 17/043; B25D 17/24;
(Continued)

(56) References Cited

U.S. PATENT DOCUMENTS 1,931,535 A * 10/1933 Gartin .................. B25D 17/043 267/137
2,531,800 A * 11/1950 Anderson ............ B25D 17/043 16/431
(Continued)

FOREIGN PATENT DOCUMENTS

JP 2015-100897 A 6/2015
JP 2015-217471 A 12/2015
(Continued)

OTHER PUBLICATIONS

Jun. 25, 2024 Office Action issued in Japanese Patent Application No. 2021-026285.

*Primary Examiner* — Robert F Long
*Assistant Examiner* — Eduardo R Ferrero
(74) *Attorney, Agent, or Firm* — Oliff PLC

(57) ABSTRACT

The power tool includes: a handle; a biasing member for biasing the handle in a direction away from a final output shaft in the axial direction; at least one guiding member disposed between a housing and a first part of the handle so as to extend in the axial direction and configured to slidably guide relative movement between the handle and the housing; and at least one elastic member disposed at least one of between the at least one guiding member and the housing and between the at least one guiding member and the first part of the handle. The at least one guiding member is disposed so as to be movable relative to the housing or the handle in a crossing direction that crosses the axial direction by elastic deformation of the at least one elastic member in the crossing direction.

13 Claims, 11 Drawing Sheets

(52) U.S. Cl.
CPC ................ *B25D 2216/0084* (2013.01); *B25D 2217/0073* (2013.01); *B25D 2250/121* (2013.01); *B25D 2250/375* (2013.01)

(58) Field of Classification Search
CPC ........ B25D 2211/006; B25D 2211/061; B25D 2211/068; B25D 2216/0084; B25D 2222/69; B25D 2250/121; B25D 2250/375; B25D 2217/0073
See application file for complete search history.

(56) References Cited

U.S. PATENT DOCUMENTS 3,322,211 A * 5/1967 Alabuzhev ........... B25D 17/043 267/170
3,650,336 A * 3/1972 Koehler ............... B25D 16/003 173/110
4,371,043 A * 2/1983 Kubokawa ................ F16F 1/12 248/560
4,401,167 A * 8/1983 Sekizawa ............. B25D 17/043 248/573
4,667,749 A * 5/1987 Keller ..................... B25F 5/006 267/140.13
4,711,308 A * 12/1987 Blaas ................... B25D 17/043 16/431
4,749,049 A * 6/1988 Greppmair .............. F16F 15/08 173/162.2
5,025,870 A * 6/1991 Gantner ............... B25D 17/043 173/162.1
5,031,273 A * 7/1991 Yamaguchi ......... B27B 17/0033 16/431
5,213,167 A * 5/1993 Best ..................... B25D 17/043 173/162.2
5,522,466 A * 6/1996 Harada ................ B25D 17/043 173/162.2
5,692,574 A * 12/1997 Terada ................. B25D 17/043 173/162.2
5,697,456 A * 12/1997 Radle ................... B25D 17/043 173/162.2
6,076,616 A * 6/2000 Kramp ................. B25D 17/043 173/211
6,148,930 A * 11/2000 Berger ................. B25D 17/043 267/137
6,286,610 B1 * 9/2001 Berger .................... B25F 5/006 173/162.1
7,076,838 B2 * 7/2006 Meixner .............. B25D 17/043 16/431
7,320,369 B2 * 1/2008 Stirm ................... B25D 17/043 173/162.1
7,322,428 B2 * 1/2008 Bacila .................. B25D 17/043 16/431
7,500,527 B2 * 3/2009 Fischer ................ B25D 17/043 173/210
7,523,790 B2 * 4/2009 Arakawa .............. B25D 17/043 173/162.1
7,526,868 B2 * 5/2009 Oki ...................... B23D 49/162 30/392
7,610,967 B2 * 11/2009 Fischer ................... B25F 5/006 173/211
7,762,348 B2 * 7/2010 Stirm ................... B25D 17/043 173/162.1
7,789,168 B2 * 9/2010 Becht ................... B25D 17/043 173/162.1
8,069,930 B2 * 12/2011 Engelfried ........... B25D 17/043 173/162.1
8,403,076 B2 * 3/2013 Iwakami ................. B25F 5/006 173/210
8,584,769 B2 * 11/2013 Friedrich ............. B25D 17/043 16/431
8,695,724 B2 * 4/2014 Nakashima ............. B25F 5/006 173/210
8,708,059 B2 * 4/2014 Hahn ..................... B25D 17/24 173/162.1
8,714,280 B2 * 5/2014 Moreno ............... B25D 17/043 173/210
8,844,647 B2 * 9/2014 Kamegai ............. B25D 17/245 173/210
9,168,649 B2 * 10/2015 Harcar ................. B25D 17/043
9,434,062 B2 * 9/2016 Kamegai ................ B25D 17/20
9,782,885 B2 * 10/2017 Yoshikane .............. B25F 5/006
9,993,915 B2 * 6/2018 Roberts ................ B25D 17/043
10,046,451 B2 * 8/2018 Roberts ................ B25D 17/043
11,279,016 B2 * 3/2022 Kurz .................... B25D 17/084
11,571,796 B2 * 2/2023 Young .................. B25D 11/125
2003/0037937 A1 * 2/2003 Frauhammer ........... B25F 5/006 173/48
2004/0177981 A1 * 9/2004 Berger ................. B25D 11/005 173/212
2006/0086515 A1 * 4/2006 Engelfried ........... B25D 17/043 173/162.1
2006/0185867 A1 * 8/2006 Frauhammer ........ B25D 17/043 173/162.1
2007/0034397 A1 * 2/2007 Fischer ................ B25D 17/043 173/162.2
2008/0029282 A1 * 2/2008 Ikuta ..................... F16F 7/1005 30/392
2008/0047724 A1 * 2/2008 Fischer ................ B25D 17/043 173/162.2
2008/0283261 A1 * 11/2008 Schmid ................ B25D 17/043 173/162.2
2009/0188688 A1 * 7/2009 Gumpert ................ B25D 17/24 173/104
2009/0321101 A1 * 12/2009 Furusawa ............... B25F 5/006 173/162.2
2010/0000751 A1 * 1/2010 Aoki ...................... B25D 17/24 173/114
2010/0012339 A1 * 1/2010 Hahn ................... B25D 17/043 173/162.1
2010/0025062 A1 * 2/2010 Engelfried ........... B25D 17/043 173/162.2
2010/0163260 A1 * 7/2010 Berger ................. B25D 17/043 173/13
2010/0206594 A1 * 8/2010 Meixner .............. B25D 17/043 173/162.2
2010/0206596 A1 * 8/2010 Kamegai .............. B25D 17/043 16/431
2010/0236800 A1 * 9/2010 Watanabe ............ B25D 17/043 173/162.2
2010/0263893 A1 * 10/2010 Fischer ................ B25D 17/043 173/162.2
2011/0114347 A1 * 5/2011 Kasuya ..................... B25F 5/00 173/2
2012/0031639 A1 * 2/2012 Roberts ................ B25D 17/043 173/162.2
2012/0055689 A1 * 3/2012 Wierer ................. B25D 17/043 173/162.2
2013/0199810 A1 * 8/2013 Wyler .................. B25D 16/006 173/162.2
2014/0262402 A1 * 9/2014 Haman ................ B25D 17/043 173/162.2
2014/0318821 A1 * 10/2014 Wyler ..................... B25F 5/006 173/104
2014/0352114 A1 * 12/2014 Yoshikane ................ B25F 5/02 16/426
2014/0352994 A1 * 12/2014 Yoshikane ........... B25D 17/043 173/162.2
2015/0090470 A1 * 4/2015 Miwa ..................... B25D 17/24 173/117
2015/0144366 A1 * 5/2015 Machida ................ B25D 16/00 173/104
2015/0144368 A1 * 5/2015 Machida ................ B25D 17/24 173/162.2
2015/0202760 A1 * 7/2015 Roberts ................ B25D 17/043 29/436
2015/0202761 A1 * 7/2015 Roberts .................. B25D 16/00 173/162.2

(56) References Cited

U.S. PATENT DOCUMENTS

| | | | | |
|---|---|---|---|---|
| 2015/0202762 | A1* | 7/2015 | Roberts | B25D 17/043 173/162.2 |
| 2015/0266176 | A1* | 9/2015 | Takeuchi | B25D 17/24 173/117 |
| 2015/0328760 | A1* | 11/2015 | Ikuta | B25D 17/043 173/117 |
| 2016/0136801 | A1 | 5/2016 | Furusawa et al. | |
| 2016/0207188 | A1* | 7/2016 | Weber | B25D 17/24 |
| 2016/0361809 | A1* | 12/2016 | Teranishi | B25D 17/043 |
| 2017/0106517 | A1* | 4/2017 | Machida | B25D 16/00 |
| 2017/0106518 | A1* | 4/2017 | Takeuchi | B25F 5/006 |
| 2017/0144287 | A1* | 5/2017 | Fischer | B25D 17/043 |
| 2018/0099392 | A1* | 4/2018 | Sunabe | B25D 17/043 |
| 2018/0099393 | A1* | 4/2018 | Iida | B25D 17/24 |
| 2018/0099394 | A1* | 4/2018 | Ichikawa | B25D 17/043 |
| 2018/0099396 | A1* | 4/2018 | Iida | B25D 17/043 |
| 2018/0345469 | A1* | 12/2018 | Tanabe | B25D 17/043 |
| 2019/0061132 | A1* | 2/2019 | Mori | B25F 5/026 |
| 2019/0291255 | A1* | 9/2019 | Yoshikane | B25D 16/006 |
| 2019/0308307 | A1* | 10/2019 | Young | B25D 17/24 |
| 2019/0381618 | A1* | 12/2019 | Furusawa | B23Q 11/127 |
| 2020/0078918 | A1* | 3/2020 | Yoshikane | B25D 17/043 |
| 2020/0078919 | A1* | 3/2020 | Machida | B25D 17/043 |
| 2020/0391369 | A1* | 12/2020 | Furusawa | B25D 11/12 |
| 2021/0207389 | A1* | 7/2021 | Schmidt | E01C 19/402 |
| 2022/0266433 | A1* | 8/2022 | Machida | B25D 17/043 |

FOREIGN PATENT DOCUMENTS

| | | | |
|---|---|---|---|
| JP | 6309881 | B2 | 4/2018 |
| JP | 6334144 | B2 | 5/2018 |
| JP | 2019-38093 | A | 3/2019 |

* cited by examiner

IV - IV

V - V

VIII - VIII

X - X

POWER TOOL HAVING A HAMMER MECHANISM

TECHNICAL FIELD

The present disclosure generally relates to a power tool configured to linearly reciprocally drive a tool accessory.

BACKGROUND

A rotary hammer (hammer drill) is configured to linearly reciprocally drive a tool accessory coupled to a tool holder along a driving axis (i.e. perform a hammering operation) and to rotationally drive the tool accessory around the driving axis (i.e. perform a drilling operation). In typical rotary hammers, a motion-converting mechanism for converting rotation of an intermediate shaft into linear motion is employed to perform the hammering operation, and a rotation-transmitting mechanism for transmitting rotation to the tool holder via the intermediate shaft is employed to perform the drilling operation. Such a rotary hammer can be subjected to a reaction force from a workpiece against the striking force of the tool accessory during the hammering operation. The reaction force generates vibration in an extension direction of the driving axis (hereinafter also referred to as an axial direction). Vibration thus generated is transmitted to a housing of the rotary hammer and to its user.

Japanese Patents No. 6309881 and No. 6334144 disclose rotary hammers each having a structure for absorbing such vibration in the axial direction. Specifically, a handle of the rotary hammer is configured to be slidable in the axial direction on a guide disposed on a motor housing accommodating a motor. The handle is biased by a biasing member in a direction away from the motor housing in the axial direction. When a tool accessory is subjected to a reaction force during the hammering operation, the force causes parts other than the handle to move rearward together with the tool accessory relative to the handle against the biasing force by the biasing member. At this time, the biasing member elastically deforms and partially cushions the reaction force. This cushioning effect serves to reduce the amount of vibration in the axial-direction transmitted to the handle due to the reaction force.

SUMMARY

A power tool is disclosed in this specification. The power tool may include a final output shaft, a motor, a driving mechanism, a housing, a handle, a biasing member, at least one guiding member, and at least one elastic member.

The final output shaft may be configured to removably hold a tool accessory. The final output shaft may define a driving axis of the tool accessory. The motor may have a rotation axis extending in parallel to the driving axis. The driving mechanism may be configured to perform at least a hammering operation of linearly reciprocally driving the tool accessory along the driving axis by using power from the motor. The housing may accommodate the motor. The handle may include a first part disposed radially outside of the housing with respect to the rotation axis and extending in an axial direction of the rotation axis, and a second part extending in a direction crossing the first part. The handle may be configured to be movable relative to the housing in the axial direction. The biasing member may bias the handle in a direction away from the final output shaft in the axial direction. The at least one guiding member may be disposed between the housing and the first part of the handle so as to extend in the axial direction, and may be configured to slidably guide relative movement between the handle and the housing. The at least one elastic member may be disposed at least one of between the at least one guiding member and the housing and between the at least one guiding member and the first part of the handle. The at least one guiding member may be disposed so as to be movable relative to the housing or the handle in a direction crossing the axial direction (hereinafter referred to as a crossing direction) by elastic deformation of the at least one elastic member in the crossing direction.

According to the power tool of the present aspect, when the tool accessory is subjected to a reaction force during the hammering operation, the housing and the handle moves relative to each other in the axial direction against a biasing force from the biasing member so that the handle gets closer to the final output shaft. At this time, the reaction force is partially cushioned by elastic deformation of the biasing member. This cushioning effect serves to reduce transmission of vibration to the handle for vibration generated in the axial direction due to the reaction force. Furthermore, according to the power tool of the present aspect, when vibration is generated in the crossing direction due to the operation of the driving mechanism and/or the motor, the at least one elastic member disposed between the housing and the handle elastically deforms in the crossing direction and thereby absorbs the vibration. This serves to reduce transmission of vibration to the handle also for vibration in the crossing-direction.

DETAILED DESCRIPTION OF THE EMBODIMENTS

Figure 1:
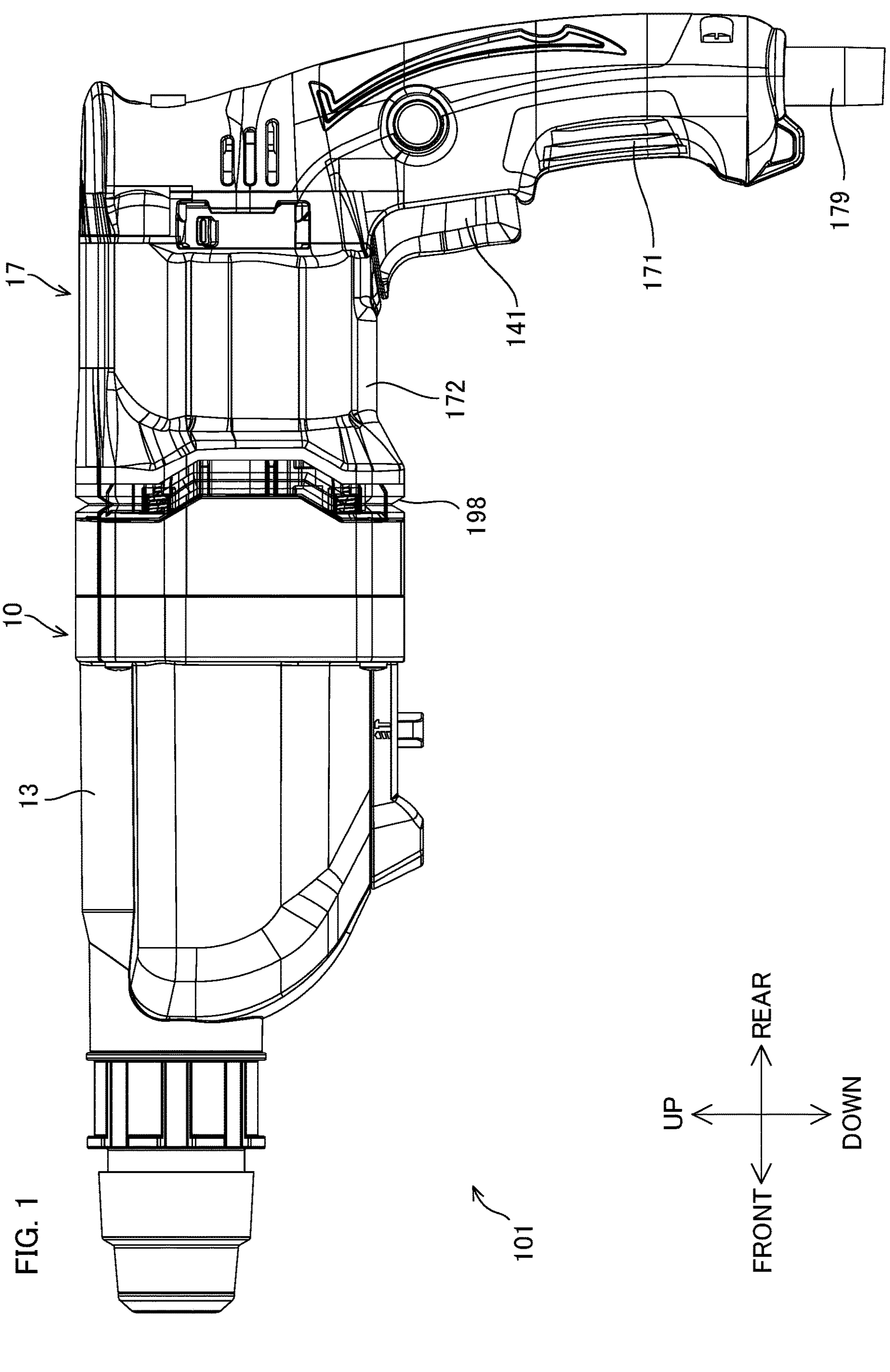
FIG. 1 is a side view of a rotary hammer according to one embodiment of the present disclosure, wherein a handle is at its initial position relative to a body housing.

In one or more of embodiments, the at least one elastic member may be disposed only one of between the at least one guiding member and the housing and between the at least one guiding member and the first part of the handle. According the present aspect, satisfactory sliding property can be achieved at the other of between the at least one guiding member and the housing and between the at least one guiding member and the first part of the handle. Therefore, the at least one guiding member can smoothly guide relative movement between the handle and the housing.

In one or more of embodiments, the at least one elastic member may be disposed only between the at least guiding member and the housing. The at least one guiding member may be disposed to be movable relative to the housing in the crossing direction. According to the present aspect, satisfactory sliding property can be achieved between the at least one guiding member and the first part of the handle. Therefore, the at least one guiding member can smoothly guide relative movement between the handle and the housing. Furthermore, according to the present aspect, the at least one elastic member and the at least one guiding member can be disposed on an outer surface of the housing. This enables easy assembly of the power tool.

In one or more of embodiments, the at least one elastic member may be at least one sponge fixedly attached to the housing. The sponge is easily deformable. Therefore, according to this aspect, the at least one elastic member can have a large amount of elastic deformation in the crossing direction. This results in improved effect in reducing transmission of vibration to the handle for vibration in the crossing-direction. Also, the sponge is made of a low-cost, lightweight material. This enables the power tool to have reduced cost and weight.

In one or more embodiments, the at least one guiding member may be fixedly attached to the at least one sponge. According to the present aspect, the at least one elastic member and the at least one guiding member are fixed relative to the housing. This enables easy assembly of the power tool.

In one or more embodiments, an allowable amount of movement of the handle relative to the housing in the axial direction may be larger than an allowable amount of movement of the at least one guiding member relative to the housing or the handle in the crossing direction. According to the present aspect, the allowable amounts of relative movements are set based on the magnitude of vibration caused. More specifically, in order to reduce the amount of vibration in the axial direction, that is, vibration of a relatively large magnitude, transmitted to the handle, the allowable amount of movement of the handle relative to the housing is set to a relatively large amount; whereas in order to reduce the amount of vibration in the crossing-direction, that is, vibration of a relatively small magnitude, transmitted to the handle, the allowable amount of movement of the at least one guiding member relative to the housing or the handle is set to a relatively small amount. That is, the two allowable amounts of relative movements are respectively optimized according to the required level of vibration-isolating performance. This prevents increase in size of the power tool.

In one or more embodiments, the at least one elastic member may include a first elastic member and a second elastic member disposed to be spaced apart from each other in the axial direction. According to the present aspect, the at least one elastic member may be subjected to a force in the crossing direction more concentrically in a small area compared to a case in which a single elastic member extends from where the first elastic member is located to where the second elastic member is located and a single guiding member extends from where the first elastic member is located to where the second elastic member is located. Therefore, the at least one elastic member can have an increased amount of elastic deformation. This results in improved effect in reducing transmission of vibration to the handle for vibration in the crossing-direction.

In one or more embodiments, the at least one guiding member may include a first guiding member and a second guiding member disposed to be spaced apart from each other in the axial direction. The at least one elastic member may be disposed so as to extend in the axial direction from where the first guiding member is located to where the second guiding member is located. According to the present aspect, the at least one elastic member may be subjected to a force in the crossing direction more concentrically in a small area compared to a case in which a single elastic member extends from where the first elastic member is located to where the second elastic member is located and a single guiding member extends from where the first elastic member is located to where the second elastic member is located. Therefore, the at least one elastic member can have an increased amount of elastic deformation. This results in improved effect in reducing transmission of vibration to the handle for vibration in the crossing-direction. Moreover, the at least one guiding member can have a shortened distance of extension as a whole. This enables the power tool to have a reduced weight. Furthermore, there is no need to distribute the at least one elastic member at where the first guiding member is located and where the second guiding member is located in the axial direction. This enables a simplified process for manufacturing.

In one or more embodiments, the at least one guiding member may be at least one pin having a circular cross section. According to the present aspect, satisfactory sliding property can be achieved in relation to the at least one guiding member. Also, manufacturing can be easy.

In one or more embodiments, the at least one guiding member and the at least one elastic member may be disposed at three locations around a circumferential direction with respect to the rotation axis. According to the present aspect, the at least one guiding members can guide relative movement between the handle and the housing with more stability. Furthermore, the at least one elastic member elastically deform in different directions from each other, respectively. This results in improved effect in reducing transmission of vibration to the handle for vibration in the crossing-direction.

The embodiment of the present disclosure is now described in more detail with reference to the drawings.

In this embodiment, a rotary hammer (hammer drill) 101 is described as an example of a power tool according to the present teachings. The rotary hammer 101 is a hand-held power tool that may be used for processing operations such as chipping and drilling. The rotary hammer 101 is configured to be capable of performing the operation (hereinafter referred to as a hammering operation) of linearly reciprocally driving a tool accessory 91 along a driving axis A1 and of performing the operation (hereinafter referred to as a drilling operation) of rotationally driving the tool accessory 91 around the driving axis A1.

Figure 2:
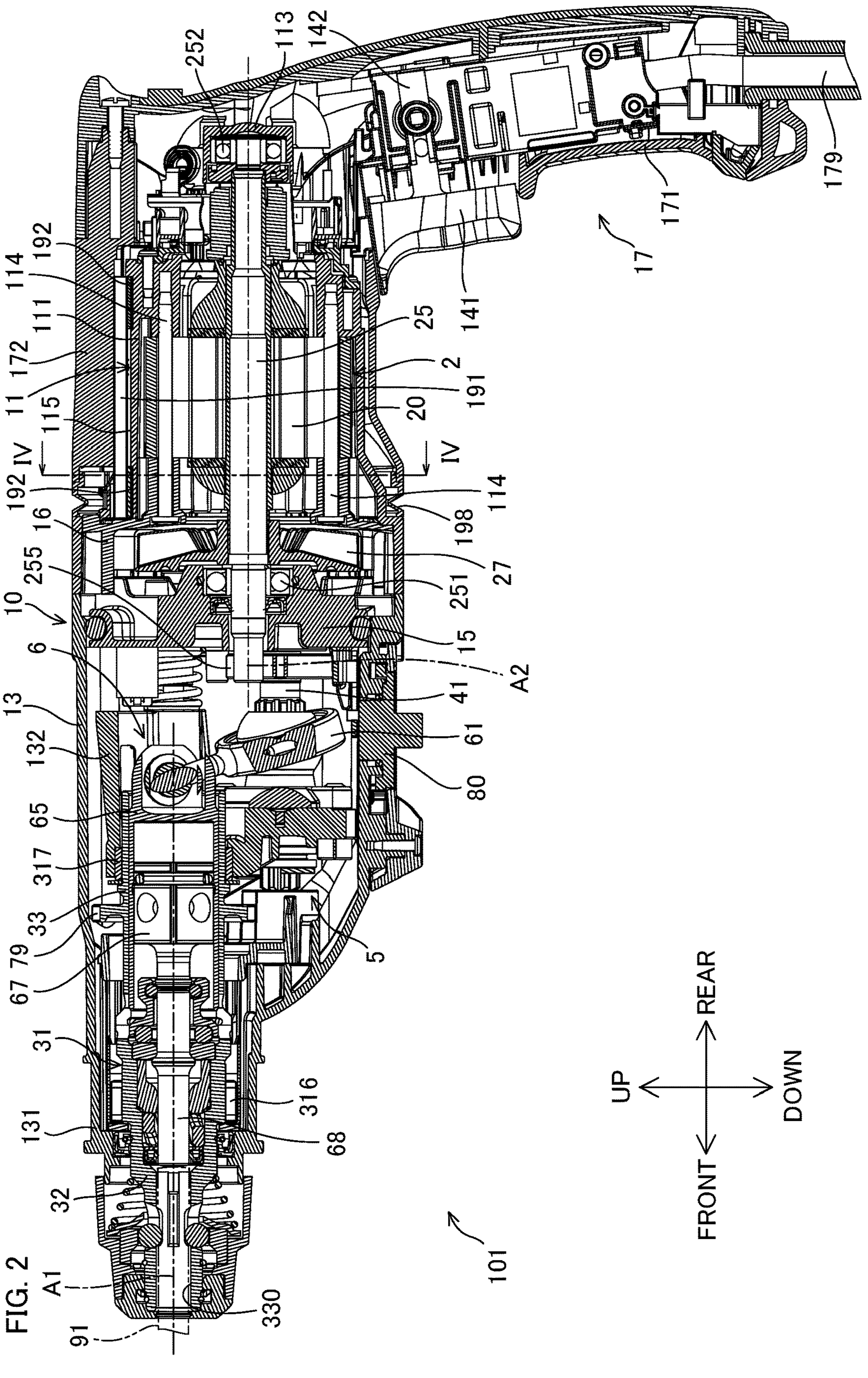
FIG. 2 is a longitudinal sectional view of the rotary hammer, wherein the handle is at its initial position relative to the body housing.

First, the general structure of the rotary hammer 101 is described with reference to FIGS. 1 and 2. As shown in FIG. 1, an outer shell of the rotary hammer 101 is mainly formed by a body housing 10 and a handle 17 connected to the body housing 10.

The body housing 10 is a hollow body that accommodates parts such as a spindle 31, a driving mechanism 5, a motor 2, and the like. The spindle 31 is an elongate member having a hollow circular cylindrical shape. At its end portion in the axial direction, the spindle 31 has a tool holder 32 configured to removably hold the tool accessory 91. A longitudinal axis of the spindle 31 defines a driving axis A1 of the tool accessory 91. The body housing 10 extends along the driving axis A1. The tool holder 32 is disposed within one end portion of the body housing 10 in an extension direction of the driving axis A1 (hereinafter simply referred to as a driving-axis direction).

The handle 17 is disposed in one side of the body housing in the axial direction (i.e. the side opposite to the side in which the tool holder 31 is disposed). The handle 17 includes a grip part 171 extending in a direction crossing (more specifically, generally orthogonal to) the driving axis A1. The grip part 171 is a portion intended to be held by a user and is formed so as to protrude in the direction crossing the driving axis A1.

In the following description, for convenience sake, the extension direction of the driving axis A1 (the longitudinal direction of the body housing 10) is defined as a front-rear direction of the rotary hammer 101. The side of one end of the rotary hammer 101 in the front-rear direction in which the tool holder 32 is disposed is defined as a front side of the rotary hammer 101; whereas the opposite side (the side of one end in which the motor 2 is disposed) is defined as a rear side of the rotary hammer 101. The direction that is orthogonal to the driving axis A1 and corresponds to a direction in which the grip part 171 extends is defined as an up-down direction of the rotary hammer 101. In the up-down direction, the side of one end in which the body housing 10 is located is defined as an upper side and the side of the protruding end of the grip part 171 is defined as a lower side. Further, the direction that is orthogonal to both the front-rear direction and the up-down direction is defined as a left-right direction of the rotary hammer 101. In the left-right direction, the side to the right when viewed from the rear side to the front side is defined as a right side of the rotary hammer 101 and the opposite side is defined as a left side of the rotary hammer 101.

The detailed structure of the rotary hammer 101 is now described. First, the structure of the body housing 10 is described. As shown in FIG. 2, the body housing 10 has a gear housing 13 and a motor housing 11. The spindle 31 and the driving mechanism 5 are accommodated in the gear housing 13. The gear housing 13 has a front end portion of a hollow circular cylindrical shape. The portion is referred to as a barrel part 131. The remaining portion of the body housing 10 other than the barrel part 131 has a generally rectangular box-like shape. A bearing support 15 is fitted into a rear end portion of the gear housing 13.

The motor 2 is accommodated in the motor housing 11. The motor housing 11 is disposed adjacent to and in the rear side of the gear housing 13. The motor housing 11 is a single (integral) member and includes a tubular part 111 and a bearing holding part 113.

The tubular part 111 is a tubular member extending in the axial direction. More specifically, the tubular part 111 includes a front end portion and a rear side portion located in the rear of the front end portion. The front end portion of the tubular part 111 has a width (in other words, a diametrical dimension around the driving axis A1) generally identical to that of the rear end portion of the gear housing 13. The rear side portion of the tubular part 111 has a smaller outer diameter than the front end portion of the tubular part 111. The bearing holding part 113 protrudes rearward from a rear end surface of the tubular part 111.

With the motor 2 disposed within the tubular part 111, a baffle plate 16 is fitted into the tubular part 111 and connected to the tubular part 111 by a plurality of screws 114. The motor 2 is thus fixedly held within the motor housing 11. The baffle plate 16 also serves to direct flow of air generated by a cooling fan 27 described later. The motor housing 11 and the gear housing 13 are fixedly connected together by means of fixation such as screws or the like.

The internal structures of the body housing 10 are now described. First, the motor 2 is described. In this embodiment, an AC motor, which may be powered by an external AC power source, is employed as the motor 2. As shown in FIG. 2, the motor 2 has: a motor body 20 including a stator and a rotor; and a motor shaft 25 configured to rotate together with the rotor. In this embodiment, a rotation axis A2 of the motor 2 (in other words, of the motor shaft 25) extends below the driving axis A1 and in parallel to the driving axis A1.

The motor shaft 25 is supported via two bearings 251 and 252 so as to be rotatable around the rotation axis A2 relative to the body housing 10. The front bearing 251 is held on a rear surface side of the bearing support 15, and the rear bearing 252 is held within the bearing holding part 113 of the motor housing 11. The cooling fan 27 for cooling the motor 2 is fixed to a portion of the motor shaft 25 between the motor body 20 and the front bearing 251.

A front end portion of the motor shaft 25 extends through the bearing support 15 and protrudes into the gear housing 13. A pinion gear 255 is fixed to this end portion of the motor shaft 25 that protrudes into the gear housing 13.

The spindle 31 is now described. The spindle 31 is a final output shaft of the rotary hammer 101. As shown in FIG. 2, the spindle 31 is arranged within the gear housing 13 along the driving axis A1 and is supported to be rotatable around the driving axis A1 relative to the body housing 10. The spindle 31 is configured as an elongate, stepped hollow circular cylindrical member.

A front half of the spindle 31 forms the tool holder 32 to or in which the tool accessory 91 can be removably attached. The tool accessory 91 is inserted into a bit-insertion hole 330 formed in a front end portion of the tool holder 32 such that a longitudinal axis of the tool accessory 91 coincides with the driving axis A1. The tool accessory 91 is held in the insertion hole 330 so as to be movable relative to the tool holder 32 in the axial direction while its rotation around the axial direction is restricted (blocked). A rear half of the spindle 31 forms a cylinder 33 configured to slidably hold a piston 65 described later. The spindle 31 is supported by bearings 316 and 317. The bearing 316 is held within the barrel part 131 and the bearing 317 is held within an inner housing 132 formed integrally with the gear housing 13.

The driving mechanism 5 is now described. In this embodiment, the driving mechanism 5 is configured to be capable of performing hammering operations of linearly reciprocally driving the tool accessory 91 along the driving axis A1 and of performing drilling operations of rotationally driving the tool accessory 91 around the driving axis A1.

More specifically, the driving mechanism 5 includes a striking mechanism 6 for performing hammering operations. The striking mechanism 6 includes a motion-converting member 61, an arm part 62, a piston 65, a striker 67, and an impact bolt 68. The motion-converting member 61 is disposed around an intermediate shaft 41. The intermediate shaft 41 extends in parallel to the rotation axis A2 of the motor shaft 25. The intermediate shaft 41 is rotatably supported by two bearings (not shown) disposed to be immovable relative to the body housing 10. Rotational force of the motor shaft 25 is transmitted to the intermediate shaft 41 via a gear (not shown) meshed with the pinion gear 255 attached to the front end of the motor shaft 25. The motion-converting member 61 is configured to oscillate (pivot or rock back and forth) in the front-rear direction in response to rotation of the intermediate shaft 41. The arm part 62 connects the motion-converting member 61 and the piston 65. Rotational motion of the intermediate shaft 41 is converted into linear motion by the motion-converting member 61 and transmitted to the piston 65 via the arm part 62.

The piston 65 is a bottomed hollow circular cylindrical member, and is disposed within the cylinder 33 of the spindle 31 so as to be slidable along the driving axis A1. The striker 67 is disposed within the piston 65 so as to be slidable along the driving axis A1. An internal space of the piston 65 in the rear of the striker 67 is defined as an air chamber that serves as an air spring. The impact bolt 68 is an intermediate element for transmitting kinetic energy of the striker 67 to the tool accessory 91. The impact bolt 68 is disposed within the tool holder 32 in front of the striker 67 so as to be movable along the driving axis A1.

When rotational motion of the intermediate shaft 41 is converted into linear motion and transmitted to the piston 65 as described above, the piston 65 is moved in the front-rear direction. At this time, the air pressure within the air chamber fluctuates and the striker 67 slides in the front-rear direction within the piston 65 by the action of the air spring. More specifically, when the piston 65 is moved forward, the air within the air chamber is compressed and its internal pressure increases. Thus, the striker 67 is pushed forward at high speed by the action of the air spring and strikes the impact bolt 68. The impact bolt 68 transmits the kinetic energy of the striker 67 to the tool accessory 91. Thus, the tool accessory 91 is linearly driven along the driving axis A1. On the other hand, when the piston 65 is moved rearward, the air within the air chamber expands and its internal pressure decreases so that the striker 67 is retracted (moved) rearward. The tool accessory 91 moves rearward along with the impact bolt 68 by being pressed against a workpiece. In this manner, the striking mechanism 6 repetitively performs the hammering operation.

Furthermore, the driving mechanism 5 includes a rotation-transmitting mechanism (not shown) for drilling operations. The rotation-transmitting mechanism is configured to transmit rotational motion of the intermediate shaft 41 to the spindle 31 and rotationally drive the tool accessory 91 around the driving axis A1. More specifically, a driving gear (not shown) is fixed to a front end portion of the intermediate shaft 41. This driving gear is meshed with a driven gear 79 fixed to an outer periphery of the cylinder 33 of the spindle 31. Therefore, the spindle 31 is rotated together with the driven gear 79 in response to rotation of the driving gear together with the intermediate shaft 41. The drilling operation is thus performed in which the tool accessory 91 held by the tool holder 32 is rotationally driven around the driving axis A1.

In this embodiment, the rotary hammer 101 is switched between three action modes, namely a hammer-drill mode (rotation with hammering), a hammer mode (hammering only), and a drill mode (rotation only). The hammer-drill mode is a mode in which the striking mechanism 6 and the rotation-transmitting mechanism are both driven, so that the hammering operation and the drilling operation are both performed, i.e. the tool accessory 91 is simultaneously rotated and axially hammered. The hammer mode is a mode in which power transmission for the drilling operation is interrupted and only the striking mechanism 6 is driven, so that only the hammering operation is performed, i.e. the tool accessory 91 is only hammered (without rotation). The drill mode is a mode in which power transmission for the hammering operation is interrupted and only the rotation-transmitting mechanism is driven, so that only the drilling operation is performed, i.e. the tool accessory 91 is only rotated (without hammering). These action modes are switched in response to the manipulation of a mode-changing dial 80. Such mechanisms for switching between the action modes are well known and thus not described here.

The above-described driving mechanism 5 is disclosed in, for example, US Patent Applications No. 2015/144366 and NO. 2016/136801, the disclosed contents of all of which are hereby fully incorporated herein by reference.

The structure of the handle 17 is now described. As shown in FIGS. 1 and 2, the handle 17 includes the grip part 171 and a tubular part 172. The tubular part 172 is a tubular portion extending in the front-rear direction. As shown in FIG. 2, the tubular part 172 is disposed radially outside of the motor housing 11 with respect to the rotation axis A2 so as to circumferentially surround the motor housing 11. The grip part 171 is an elongate hollow body extending from a rear end of the tubular part 172 in a direction crossing the rotation axis A2. In this embodiment, the tubular part 172 is integrally formed with a front side portion of the grip part 171. The integrally formed tubular part 172 and the front end portion of the grip part 171 are connected with a rear side portion of the grip part 171 by screws so as to form the handle 17.

A power cable 179 extends from the lower end of the grip part 171 and can be connected to an external alternate current (AC) power source. The grip part 171 has a trigger 141 to be depressed (pulled) by a user. A switch 142 configured to be turned ON in response to a depressing operation of the trigger 141 is disposed within the grip part 171. In the rotary hammer 101, when the switch 142 is turned ON, the motor 2 is energized and the driving mechanism 5 is driven so that the hammering operation and/or the drilling operation is performed.

Figure 4:
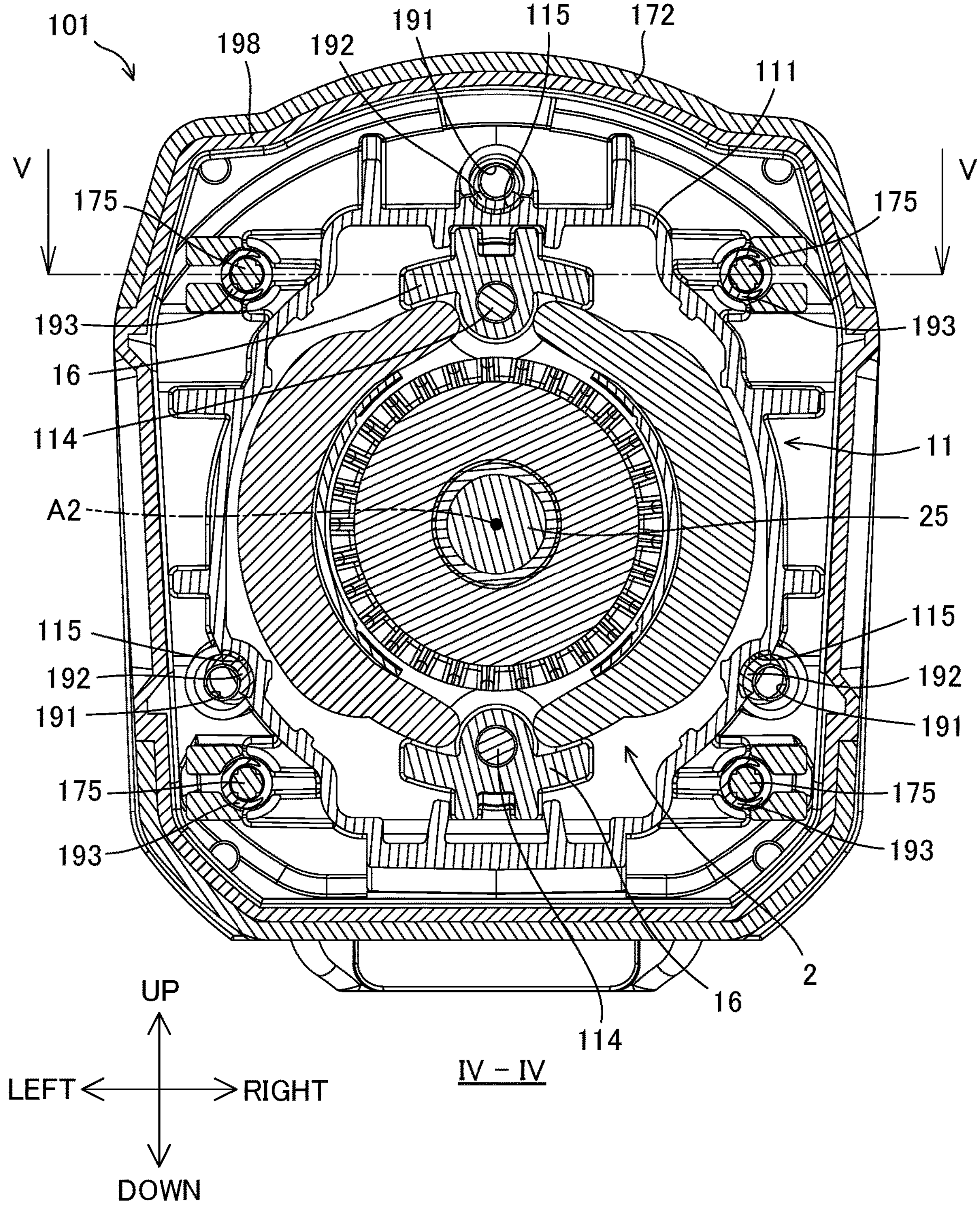
FIG. 4 is a sectional view taken along line IV-IV in FIG. 2, wherein the handle is at its initial position relative to the body housing.

In this embodiment, the body housing 10 and the handle 17 are connected via an extendable bellows 198. More specifically, as shown in FIGS. 2 and 4, the bellows 198 has a ring shape circumferentially surrounding the rotation axis A2. A front end of the bellows 198 is connected with the motor housing 11 and a rear end of the bellows 198 is connected with the tubular part 172 of the handle 17.

In this embodiment, the rotary hammer 101 is configured to reduce the amount of vibration caused by the operation of the motor 2 and the driving mechanism 5 to be transmitted to the handle 17. The structure for isolating such vibration is described below.

Figure 3:
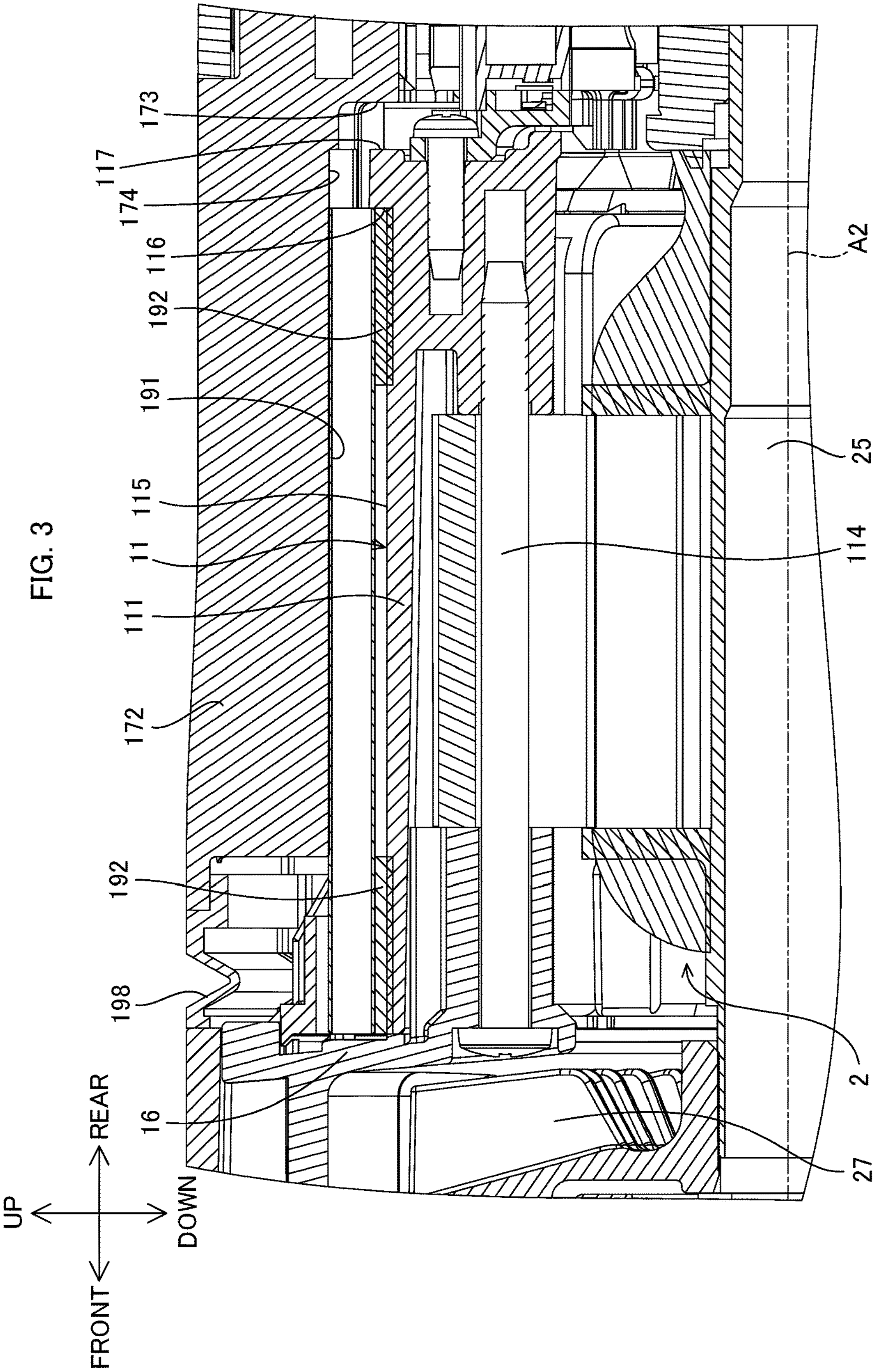
FIG. 3 is a partial enlarged view of FIG. 2.
Figure 9:
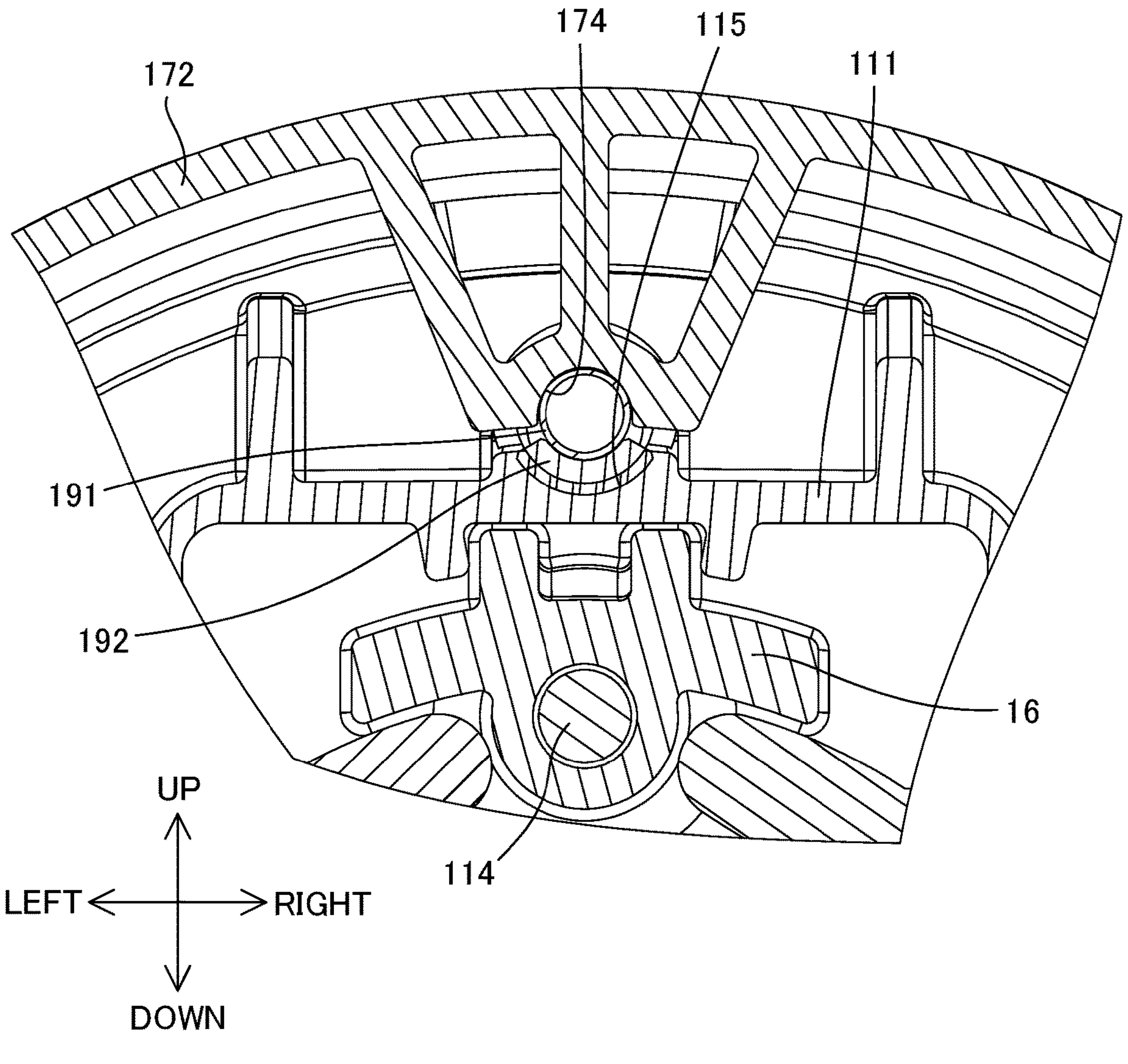
FIG. 9 is a partial enlarged view of FIG. 8.

As a vibration-isolating structure, the body housing 10 and the handle 17 are configured to be movable relative to each other in the front-rear direction. This relative movement is slidably guided by three guiding members 191 disposed between the body housing 10 (more specifically, the motor housing 11) and the handle 17 (more specifically, the tubular part 172) and extending in the front-rear direction. More specifically, as shown in FIGS. 2 to 4, three grooves 115 are formed in an outer surface of the tubular part 111 of the motor housing 11 and extend in the front-rear direction. As shown in FIG. 3, a front end of each groove 115 reaches a front end of the tubular part 111 and a rear end of each groove 115 ends at a rear side inner surface 116 without reaching the rear end surface 117 of the tubular part 111. As shown in FIG. 4, the three grooves 115 are respectively disposed at three locations around a circumferential direction with respect to the rotation axis A2. In this embodiment, the three grooves 115 are arranged equiangularly (that is, to be rotationally symmetric through 120 degrees with respect to the rotation axis A2). As shown in FIG. 9, each groove 115 has an arc-shaped cross section.

As shown in FIGS. 3 and 9, the three guiding members 191 are respectively disposed inside the three grooves 115. Each guiding member 191 is partially accommodated within the corresponding groove 115, with its majority located outside of the groove 115. As shown in FIG. 3, the length of each guiding member 191 is slightly smaller than the length of the corresponding groove 115. The front end of each groove 115 is blocked with the baffle plate 16. Therefore, the guiding member 191 is located within the groove 115 in a state in which its movement in the front-rear direction is substantially restricted by the baffle plate 191 and the rear side inner surface 161.

As shown in FIG. 9, in this embodiment, the guiding member 191 is in the form of a pin having a circular cross section. In particular, in this embodiment, the guiding member 191 has a hollow shape. This enables the guiding member 191 and thus the rotary hammer 101 to have reduced weights.

Figure 8:
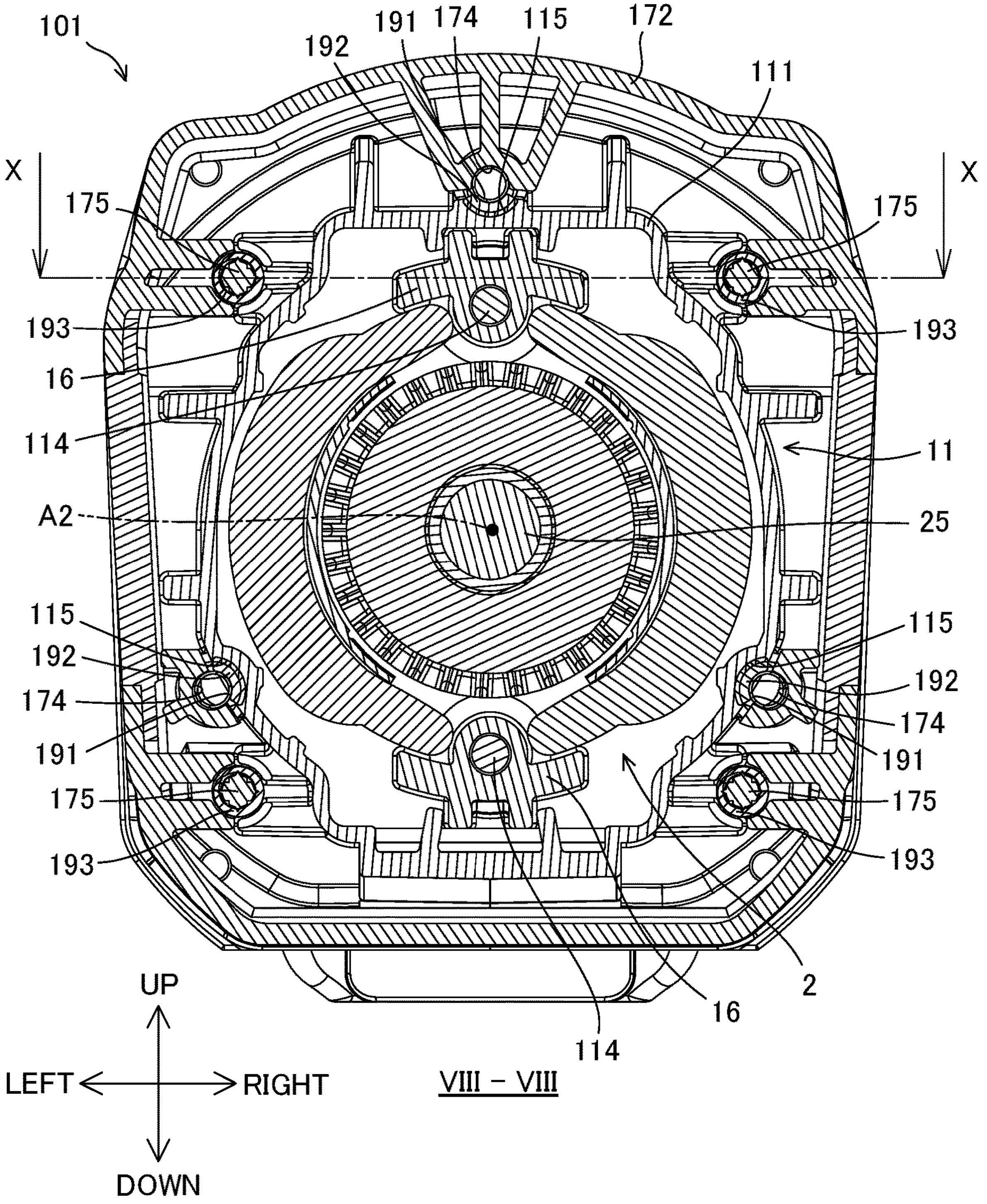
FIG. 8 is a sectional view taken along line VIII-VIII in FIG. 7, wherein the handle is at its closest position relative to the body housing.

Also, as shown in FIGS. 3 and 9, three guiding grooves 174 are formed in an inner surface of the tubular part 172 of the handle 17 and extend in the front-rear direction. As shown in FIG. 9, each guiding groove 174 has an arc-shaped cross section conforming to an outer peripheral surface of the corresponding guiding member 191. As shown in FIG. 8, the three guiding grooves 174 are respectively located at positions corresponding to the three grooves 115 and the three guiding members 191, respectively. The handle 17 can move relative to the body housing 10 in the front-rear direction by having the inner surface of the tubular part 172, in which the guiding grooves 174 are formed, sliding on the guiding members 191.

The use of a pin having a circular cross section as the guiding member 191 as in this embodiment can provide satisfactory sliding property and also enables easy manufacturing. Note that, however, each guiding member 191 and its corresponding guiding groove 174 can have freely-selected shapes conforming to each other. Also, in this embodiment, the guiding members 191 are respectively disposed at three locations around the circumferential direction. Therefore, relative movement between the handle 17 and the body housing 10 can be guided with more stability.

As shown in FIGS. 3 and 9, within each groove 115, an elastic member 192 is disposed between the tubular part 111 and the guiding member 191. The elastic member 192 in this embodiment is formed of sponge, that is, resin made by foam molding (e.g., polyurethane). In this embodiment, the elastic member 192 is fixedly attached to the tubular part 111 by using freely-selected means for fixation (e.g., adhesive). Furthermore, the guiding member 191 is fixedly attached to the elastic member 192 by using freely-selected means for fixation (e.g., adhesive). According to this structure, the elastic members 192 and the guiding members 191 are fixed to the tubular part 111. This enables easy assembly of the rotary hammer 101 (more specifically, easy process of fitting the tubular part 111 into the tubular part 172 of the handle 17). Note that, however, the means for fixation may be omitted at least between the tubular part 111 and the elastic member 192 or between the guiding member 191 and the elastic member 192. In this embodiment, the elastic member 192 is disposed in a slightly compressed state between the tubular part 111 and the guiding member 191. When subjected to a force in a direction crossing the rotation axis A2 (also referred to as a crossing direction), the elastic member 192 can elastically deform further in the crossing direction. By initially placing the elastic member 192 in this slightly compressed state, satisfactory sliding property can be achieved between the guiding member 191 and the tubular part 172.

As such, the guiding member 191 is fixed to the motor housing 11 via the elastic member 192, rather than being directly fixed to the motor housing 11. Therefore, the guiding member 191 is movable relative to the motor housing 11 in the crossing direction according to the amount of elastic deformation of the elastic member 192 in the crossing direction. In other words, the guiding member 191 is held in a floating state (in a state in which the guiding member 191 is floated) between the tubular part 111 and the tubular part 172.

As shown in FIG. 3, in this embodiment, two elastic members 192 are provided for each groove 115. One of the elastic members 192 is disposed in the front end of the groove 115 and the other one of the elastic members 192 is disposed in the rear end of the groove 115. A clearance radially extends between the tubular part 111 and the guiding member 191 in the space between the two elastic members 192.

Figure 5:
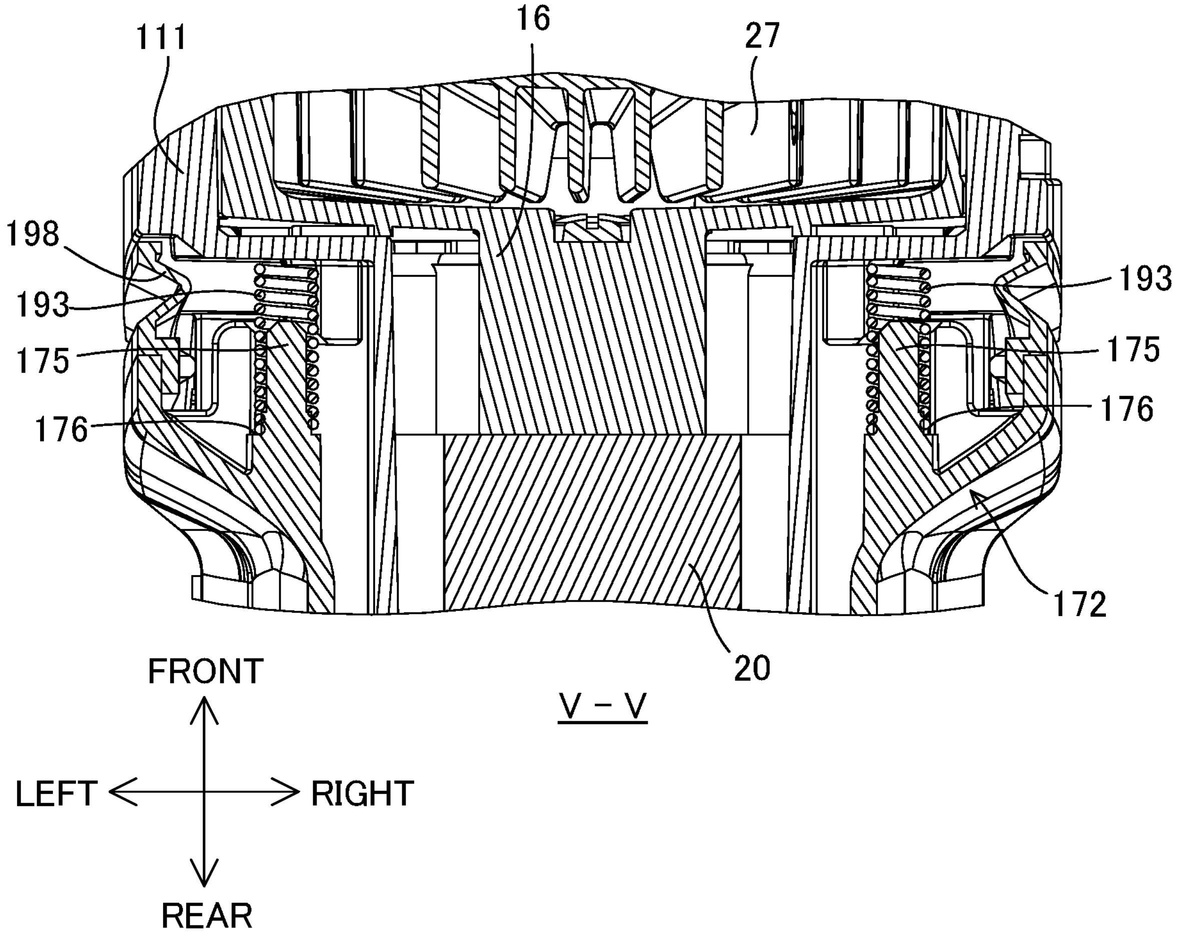
FIG. 5 is a partial sectional view taken along line V-V in FIG. 4, wherein the handle is at its initial position relative to the body housing.

In such a structure in which the handle 17 is movable relative to the body housing 10 in the front-rear direction, the handle 17 is biased rearward (in other words, in a direction away from the spindle 31 in the front-rear direction). More specifically, as shown in FIGS. 4 and 5, the rotary hammer 101 includes four biasing springs 193. As shown in FIG. 5, the biasing spring 193 is in the form of a coil spring and is disposed in a compressed state between the tubular part 111 and the tubular part 172. The tubular part 172 includes a projection 175 near its front end. The projection 175 protrudes frontward inside the outer periphery of the tubular part 172. A stepped part 176 is formed at the base of the projection 175 by having an increased diameter. The biasing spring 193 is disposed such that the projection 175 is located within the biasing spring 193 and the stepped part 176 serves as a seat for the spring. The handle 17 is always biased rearward by the biasing spring 193.

As shown in FIG. 4, in this embodiment, the biasing spring 193 and the projection 175 are disposed near every corner of the rotary hammer 101 such that four pairs of the biasing spring 193 and the projection 175 are arranged symmetrical both laterally and vertically in the longitudinal cross section of the rotary hammer 101. Therefore, the handle 17 can be biased uniformly on a plane orthogonal to the rotation axis A2.

Figure 6:
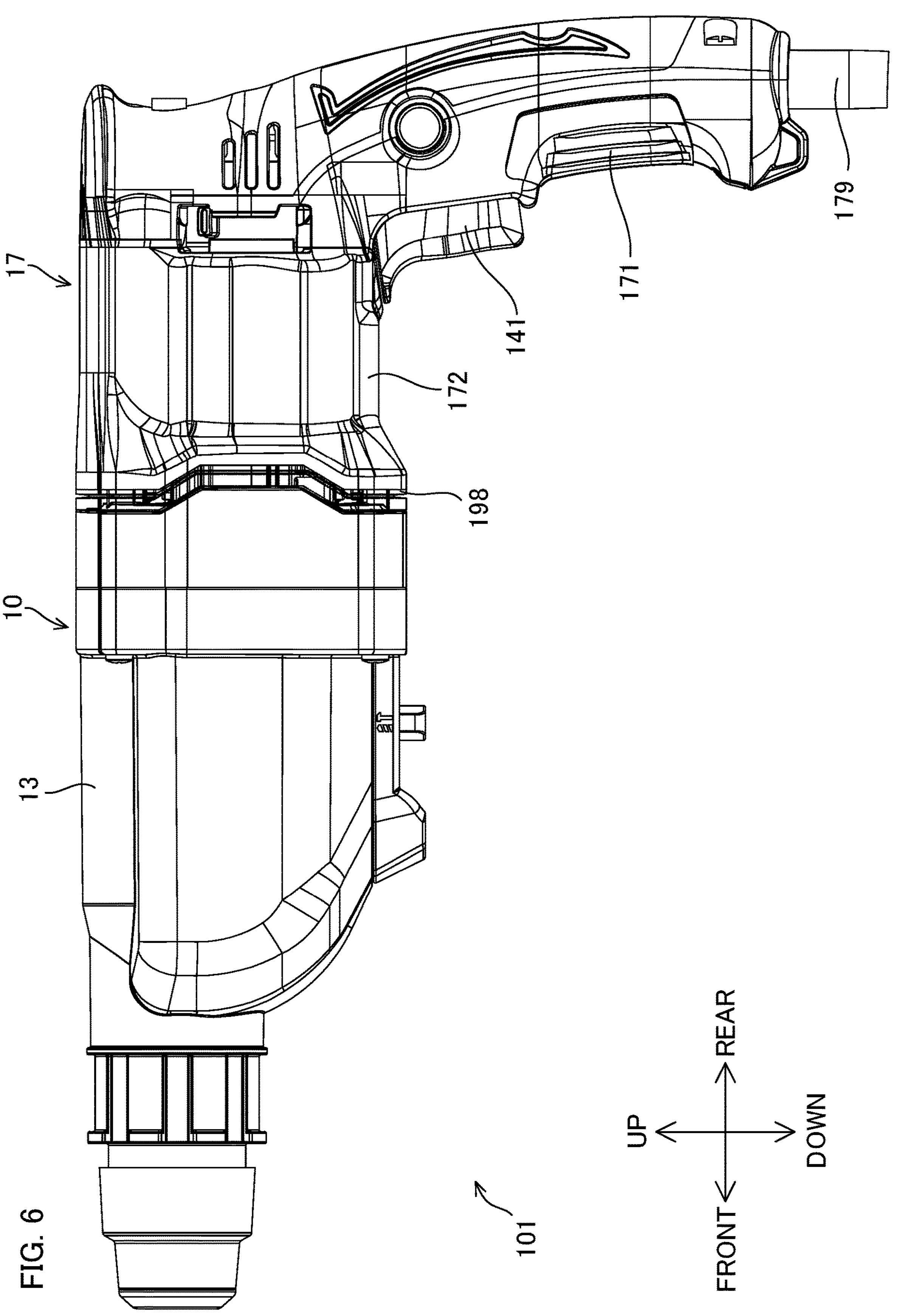
FIG. 6 is a side view of the rotary hammer, wherein the handle is at its closest position relative to the body housing.
Figure 7:
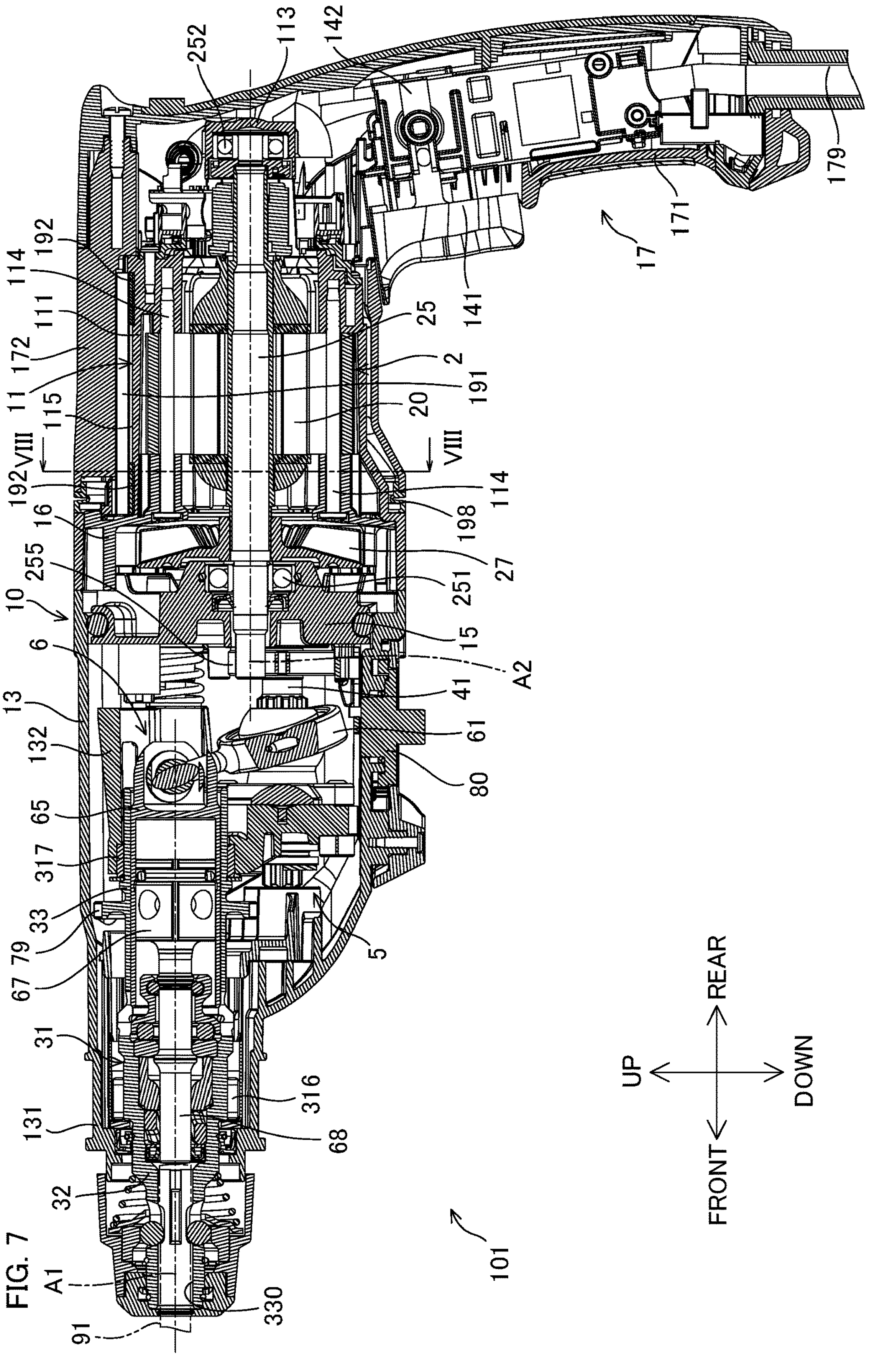
FIG. 7 is a longitudinal sectional view of the rotary hammer, wherein the handle is at its closest position relative to the body housing.
Figure 10:
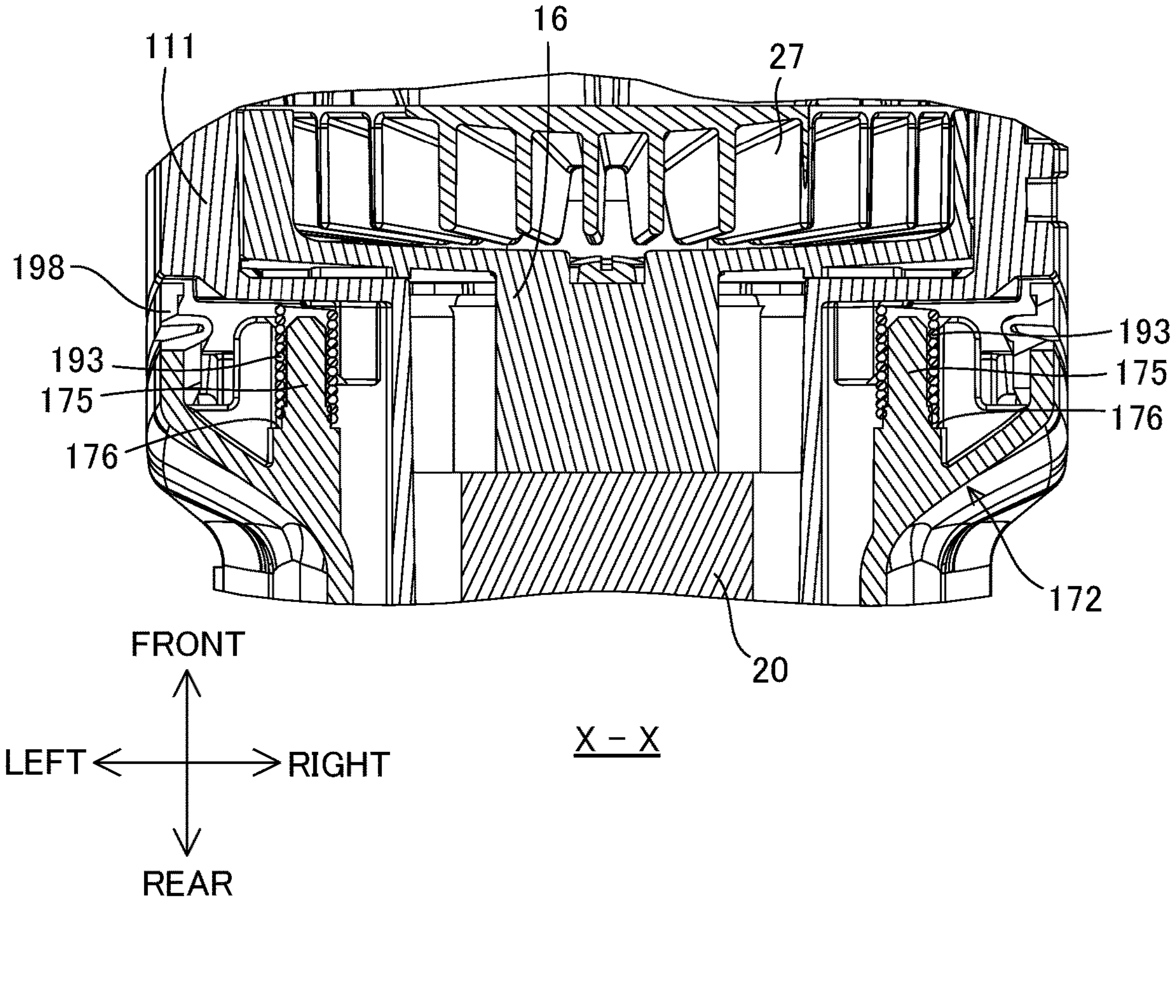
FIG. 10 is a partial sectional view taken along line X-X in FIG. 8, wherein the handle is at its closest position relative to the body housing.

With such a structure, in the rotary hammer 101, the handle 17 is movable relative to the body housing 10 in the front-rear direction between an initial position shown in FIGS. 1 to 3 and FIG. 5 and a closest position shown in FIGS. 6, 7, and 10. The initial position is a relative position of the handle 17 when no force is applied to the body housing 10 and the handle 17 in the front-rear direction. The closest position is another relative position of the handle 17 when a force is applied to the body housing 10 and the handle 17 in the front-rear direction so that the body housing 10 and the handle 17 are closest to each other. The closest position is defined by the rear end surface 117 (see FIG. 3) of the tubular part 111 abutting on an abutment part 173 (see FIG. 3) of the tubular part 172. The abutment part 173 is a part protruding radially inward from the inner surface of the tubular part 172 and serves as a stopper for restricting movement of the handle 17 relative to the body housing 10 in the front-rear direction. Meanwhile, the initial position is defined by abutment parts (not shown) respectively provided on the motor housing 11 and the handle 17 abutting with each other.

According to the rotary hammer 101 described hereinabove, when the tool accessory 91 is subjected to a rearward reaction force during the hammering operation, the spindle 31 holding the tool accessory 91 as well as the body housing 10 supporting the spindle 31 and the driving mechanism 5 are also subjected to a rearward reaction force. This causes the handle 17 to move from the initial position to the closest position relative to the body housing 10 (in practice, the body housing 10 moves since the handle 17 is held by a user). That is, while being slidably guided by the guiding member 191, the body housing 10 and the handle 17 move relative to each other in the front-rear direction so that the handle 17 gets closer to the spindle 31 against a biasing force from the biasing spring 193. At this time, the reaction force is partially cushioned by elastic deformation of the biasing spring 193. This cushioning effect serves to reduce transmission of vibration to the handle 17 for vibration generated in the front-rear direction due to the reaction force.

Furthermore, according to the rotary hammer 101, when vibration is generated in a direction crossing the front-rear direction (hereinafter also referred to as a crossing direction) due to the operation of the motion converting member 61 and/or the motor 2, the elastic member 192 disposed between the motor housing 11 and the tubular part 172 of the handle 17 elastically deforms in the direction of the vibration and thereby absorbs the vibration. This serves to reduce transmission of vibration to the handle 17 also for vibration in the crossing direction.

Furthermore, according to the rotary hammer 101, the elastic member 192 is disposed only between the guiding member 191 and the motor housing 11 but not between the guiding member 191 and the tubular part 172 of the handle 17. Therefore, satisfactory sliding property can be achieved between the guiding member 191 and the tubular part 172. Therefore, the guiding member 191 can smoothly guide relative movement between the body housing 10 and the handle 17.

Furthermore, easily deformable sponge is used as the elastic member 192. Therefore, the elastic member 192 can have an increased amount of elastic deformation in the crossing direction. This results in improved effect in reducing transmission of vibration to the handle 17 for vibration in the crossing direction.

Furthermore, in the rotary hammer 101, two elastic members 192 are provided for one guiding member 191 and are disposed to be spaced apart from each other in the front-rear direction. Therefore, the elastic member 192 may be subjected to a force in the crossing direction more concentrically in a small area compared to a case in which a single elastic member 192 having the same length as the guiding member 191 is used (that is, the guiding member 191 and the elastic member 192 are in contact with each other over the overall length of the guiding member 191). Therefore, the elastic member 192 can have an increased amount of elastic deformation, and this results in improved effect in reducing transmission of vibration to the handle 17 for vibration in the crossing direction.

Furthermore, the elastic members 192 are respectively disposed at three locations around the circumferential direction. Therefore, the elastic members 192 at different circumferential positions elastically deform in directions different from each other. This results in improved effect in reducing transmission of vibration to the handle 17 for vibration in the crossing direction.

In the rotary hammer 101, in this embodiment, the allowable amount of movement of the handle 17 relative to the body housing 10 in the front-rear direction (that is, the amount of movement of the handle 17 between the initial position and the closest position) may be set larger than the allowable amount of the guiding member 191 relative to the body housing 10 in the crossing direction (in other words, the amount of elastic deformation of the elastic member 192 from its initial state). Normally, vibration in the front-rear direction due to the reaction force is larger than vibration in the crossing direction. Therefore, with this structure, the two allowable amounts of relative movements are respectively optimized according to the amount of vibration (that is, according to the required level of vibration-isolating performance). This prevents increase in size of the rotary hammer 101.

Correspondences between the features of the above-described embodiment and the features of the claims are as follows. The features of the above-described embodiment are, however, merely exemplary and do not limit the features of the present invention. The rotary hammer 101 is an example of the "power tool". The spindle 31 is an example of the "final output shaft". The driving axis A1 is an example of the "driving axis". The motor 2 is an example of the "motor". The driving mechanism 5 is an example of the "driving mechanism". The body housing 10 (more specifically, the motor housing 11) is an example of the "housing". The handle 17 is an example of the "handle". The tubular part 172 is an example of the "first part". The grip part 171 is an example of the "second part". The biasing spring 193 is an example of the "biasing member". The guiding member 191 is an example of the "at least one guiding member". The elastic member 192 is an example of the "at least one elastic member".

The above-described embodiment is merely an exemplary embodiment of the present disclosure, and power tools, such as rotary hammers and hammer drills, according to the present disclosure are not limited to the rotary hammer 101 of the illustrated structure. For example, the following modifications may be made. One or more of these modifications may be employed in combination with the rotary hammer 101 of the above-described embodiment or any one of the claimed aspects.

Figure 11:
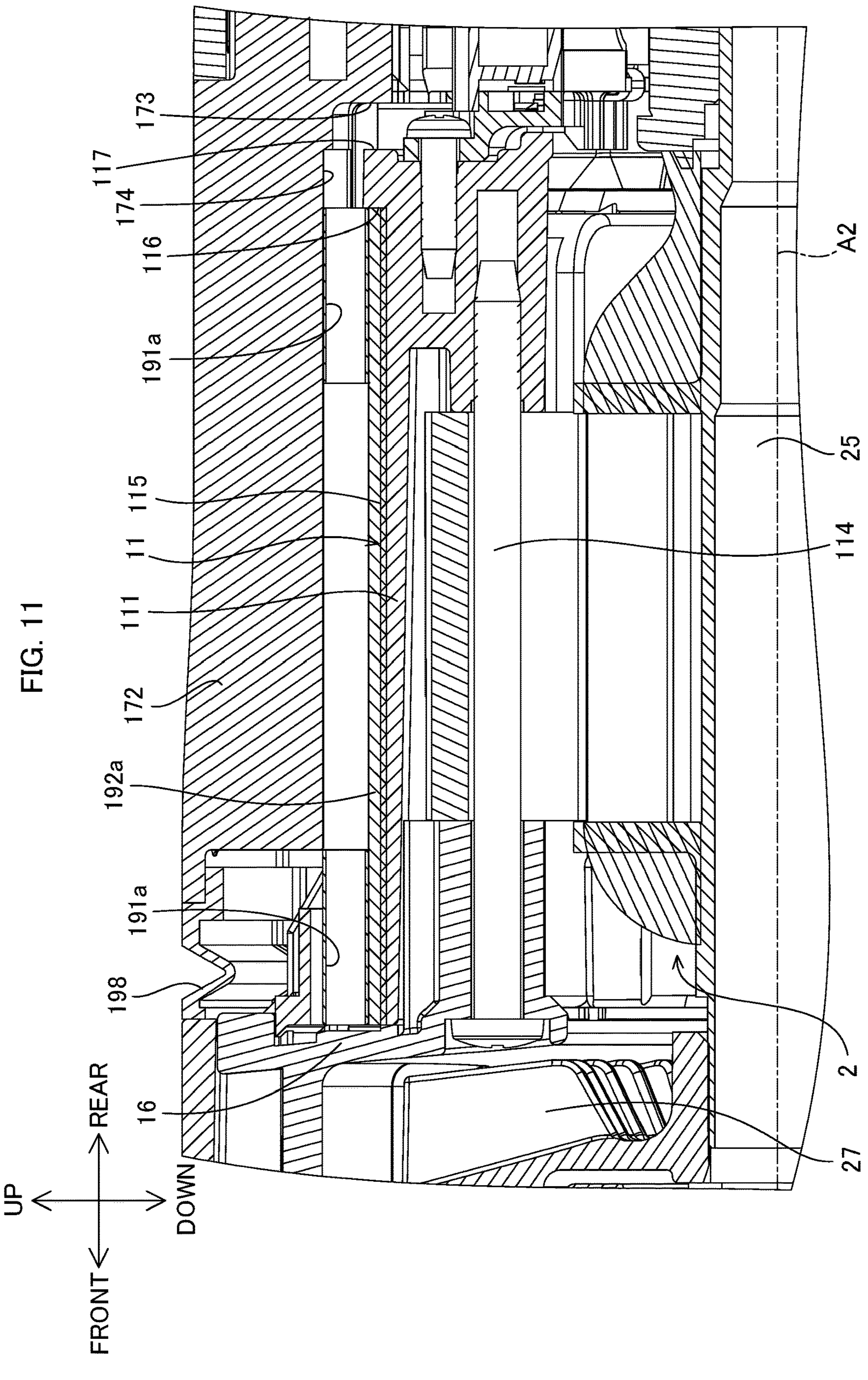
FIG. 11 is a partial longitudinal sectional view of a rotary hammer according to an alternative embodiment, corresponding to FIG. 3.

Instead of the guiding member 191 and the elastic member 192, guiding members 191*a* and an elastic member 192*a* may be used as shown in FIG. 11. In this example, two guiding members 191*a*, namely a front guiding member and a rear guiding member, are provided for one groove 115. The guiding members 191*a* are coaxially disposed to be spaced apart from each other in the front-rear direction. The front guiding member 191*a* is disposed in the front end of the groove 115 and the rear guiding member 191*a* is disposed in the rear end of the groove 115. Therefore, the two guiding members 191*a* as a whole can deliver a guiding performance equivalent to that by the above-described guiding member 191. The elastic member 192*a* is disposed to extend over the overall length of the groove 115 in the front-rear direction.

With this structure, the elastic member 192*a* may be subjected to a force in the crossing direction concentrically in a small area, as with the structure shown in FIG. 3. Therefore, the elastic member 192*a* can have an increased amount of elastic deformation, and this results in improved effect in reducing transmission of vibration to the handle 17 for vibration in the crossing direction. In a further alternative embodiment, elastic members 192*a* may also be disposed to be spaced apart from each other in the front-rear direction. That is, the elastic member 192*a* may only be disposed at positions where the guiding members 191*a* are located in the front-rear direction. This provides the similar effect as with the structure shown in FIG. 11. Note that, in a further alternative embodiment, both the guiding member 191 and the elastic member 192 may be disposed to extend over the overall length of the groove 115.

The material of the elastic member 192 is not limited to sponge, but may be a freely-selected elastic material that is elastically deformable in the crossing direction. For example, the elastic member 192 may be formed of flexible resin such as silicone resin, urethane, and the like.

A freely-selected number of elastic members 192 may be used. For example, the guiding member 191 and the elastic member 192 may be disposed at four locations around the circumferential direction similarly to the biasing member 193.

In addition to between the tubular part 111 and the guiding member 191, the elastic member 192 may also be disposed between the tubular part 172 and the guiding member 191 (that is, on the interface where sliding occurs). In this case, the elastic member 192 may be formed of a material more wear-resistant than sponge.

Alternatively, instead of between the tubular part 111 and the guiding member 191, the elastic material 192 may be disposed between the tubular part 172 and the guiding member 191 such that the guiding member 191 is movable relative to the handle 17 in the crossing direction. In this case, the guiding member 191 and the tubular part 111 (more specifically, an inner surface of a guiding groove formed in the tubular part 111) may slide relative to each other. The elastic member 192 may be disposed within the groove formed in the inner surface of the tubular part 172.

In the above-described embodiments, the rotary hammer 101 capable of performing hammering operations and drilling operations is illustrated as an example of a power tool. However, the power tool may alternatively be an electric hammer (scraper, demolition hammer) capable of performing hammering operations only.

DESCRIPTION OF THE REFERENCE NUMERALS

2: motor, 5: driving mechanism, 6: striking mechanism, 10: body housing, 11: motor housing, 13: gear housing, 15: bearing support, 16: baffle plate, 17: handle, 20: motor body, 25: motor shaft, 27: cooling fan, 31: spindle, 32: tool holder, 33: cylinder, 41: intermediate shaft, 61: motion-converting member, 62: arm part, 65: piston, 67: striker, 68: impact bolt, 79: driven gear, 80: mode-changing dial, 91: tool accessory, 101: rotary hammer, 111: tubular part, 113: bearing holding part, 114: screw, 115: groove, 116: rear side inner surface, 117: rear end surface, 131: barrel part, 132: inner housing, 141: trigger, 142: switch, 171: grip part, 172: tubular part, 173; abutment part, 174: guiding groove, 175: projection, 176: stepped part, 179: power cable, 191, 191*a*: guiding member, 192, 192*a*: elastic member, 193: biasing spring, 198: bellows, 251, 252: bearing, 255: pinion gear, 316, 317: bearing, 330: bit-insertion hole, A1: driving axis, A2: rotation axis.

What is claimed is:

1. A power tool comprising:

a final output shaft configured to removably hold a tool accessory and defining a driving axis of the tool accessory;

a motor having a rotation axis extending in parallel to the driving axis;

a driving mechanism configured to perform at least a hammering operation of linearly reciprocally driving the tool accessory along the driving axis by using power from the motor;

a housing accommodating the motor:

a handle including a first part disposed radially outside of the housing with respect the rotation axis and extending in an axial direction of the rotation axis, and a second part extending in a direction crossing the first part, the handle being configured to be movable relative to the housing in the axial direction;

a biasing member configured to bias the handle in a direction away from the final output shaft in the axial direction;

at least one guiding member disposed between the housing and the first part of the handle so as to extend in the axial direction, the at least one guiding member being configured to slidably guide relative movement between the handle and the housing; and at least one elastic member disposed between the at least one guiding member and one of the housing and the first part, wherein:

the other of the housing and the first part is configured to be movable relative to the at least one of guiding member in the axial direction through sliding movement without interference of the at least one elastic member, and the at least one guiding member is disposed so as to be movable relative to the housing or the handle in a crossing direction that crosses the axial direction by elastic deformation of the at least one elastic member in the crossing direction.

2. The power tool as defined in claim 1, wherein:

the at least one elastic member is disposed only between the at least one guiding member and the housing, and the at least one guiding member is disposed so as to be movable relative to the housing in the crossing direction.

3. The power tool as defined in claim 2, wherein the at least one elastic member is at least one sponge fixedly attached to the housing.

4. The power tool as defined in claim 3, wherein the at least one guiding member is fixedly attached to the at least one sponge.

5. The power tool as defined in claim 1, wherein the allowable amount of movement of the handle relative to the housing in the axial direction is larger than the allowable amount of the at least one guiding member relative to the housing or the handle in the crossing direction.

6. The power tool as defined in claim 1, wherein the at least one elastic member includes a first elastic member and a second elastic member disposed to be spaced apart from each other in the axial direction.

7. The power tool as defined in claim 1, wherein:

the at least one guiding member includes a first guiding member and a second guiding member disposed to be spaced apart from each other in the axial direction, and the at least one elastic member is disposed so as to extend in the axial direction from where the first guiding member is located to where the second guiding member is located.

8. The power tool as defined in claim 1, wherein the at least one guiding member is at least one pin having a circular cross section.

9. The power tool as defined in claim 1, wherein the at least one guiding member and the at least one elastic member are disposed at three locations around a circumferential direction with respect to the rotation axis.

10. The power tool as defined in claim 1, wherein:
the at least one elastic member is disposed only between the at least one guiding member and the housing,
the at least one guiding member is disposed so as to be movable relative to the housing in the crossing direction, and
the allowable amount of movement of the handle relative to the housing in the axial direction is larger than the allowable amount of the at least one guiding member relative to the housing or the handle in the crossing direction.

11. The power tool as defined in claim 1, wherein:
the at least one elastic member is disposed only between the at least one guiding member and the housing,
the at least one guiding member is disposed so as to be movable relative to the housing in the crossing direction, and
the at least one guiding member and the at least one elastic member are disposed at three locations around a circumferential direction with respect to the rotation axis.

12. The power tool as defined in claim 1, wherein:
the at least one elastic member is disposed only between the at least one guiding member and the housing,
the at least one guiding member is disposed so as to be movable relative to the housing in the crossing direction,
the at least one elastic member is at least one sponge fixedly attached to the housing, and
the at least one guiding member is at least one pin having a circular cross section.

13. The power tool as defined in claim 1, wherein the other of the housing and the first part is configured to be slidable on the at least one of guiding member so that the other of the housing and the first part is movable relative to the at least one of guiding member in the axial direction.

* * * * *